Jan. 20, 1942.  J. L. NORTON ET AL  2,270,383
BEVERAGE DISPENSING APPARATUS
Filed Sept. 12, 1939  4 Sheets-Sheet 1
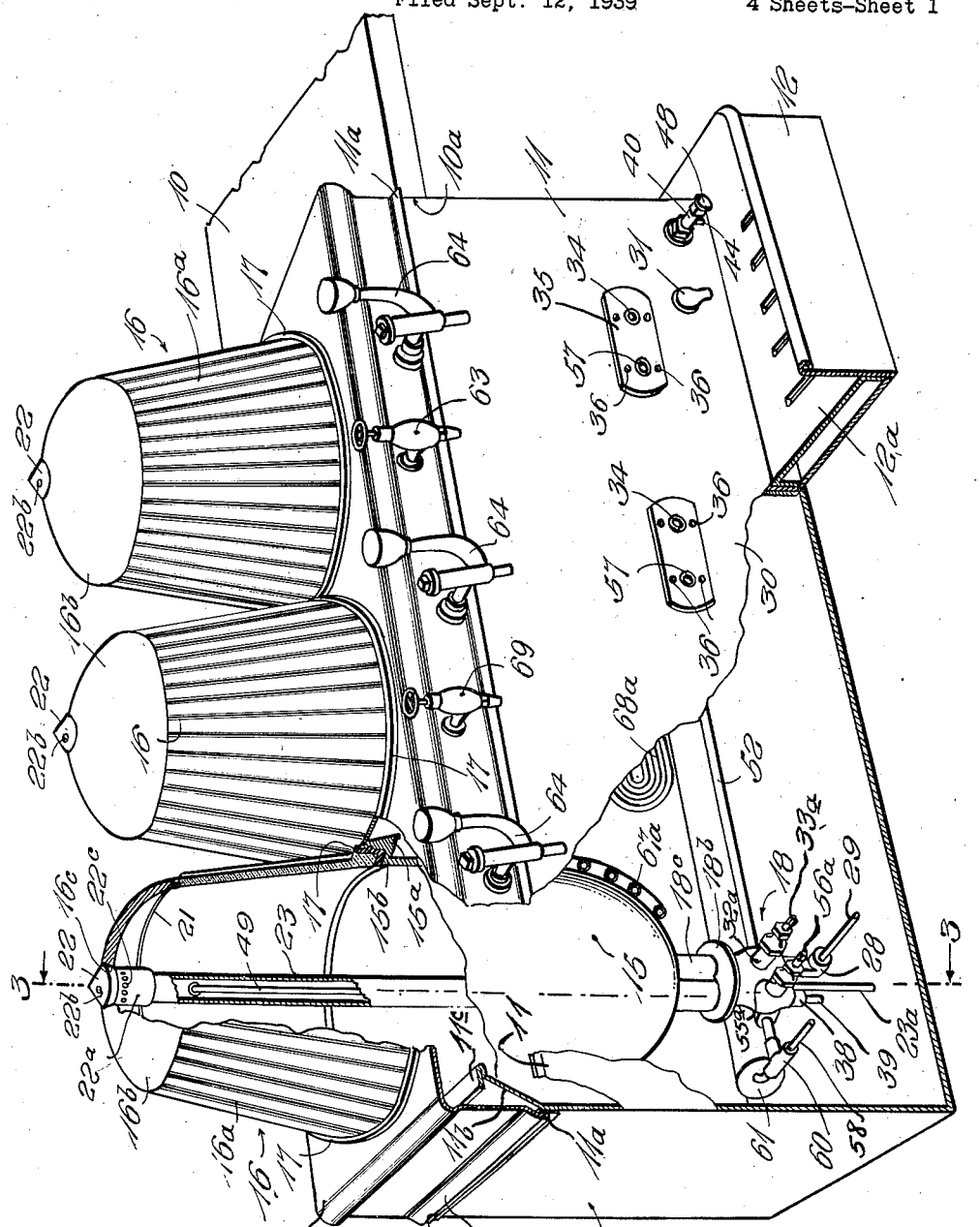
INVENTORS
J. L. NORTON,
BY A. S. LEVIN,
Eugene E. Stevens
ATTORNEY.

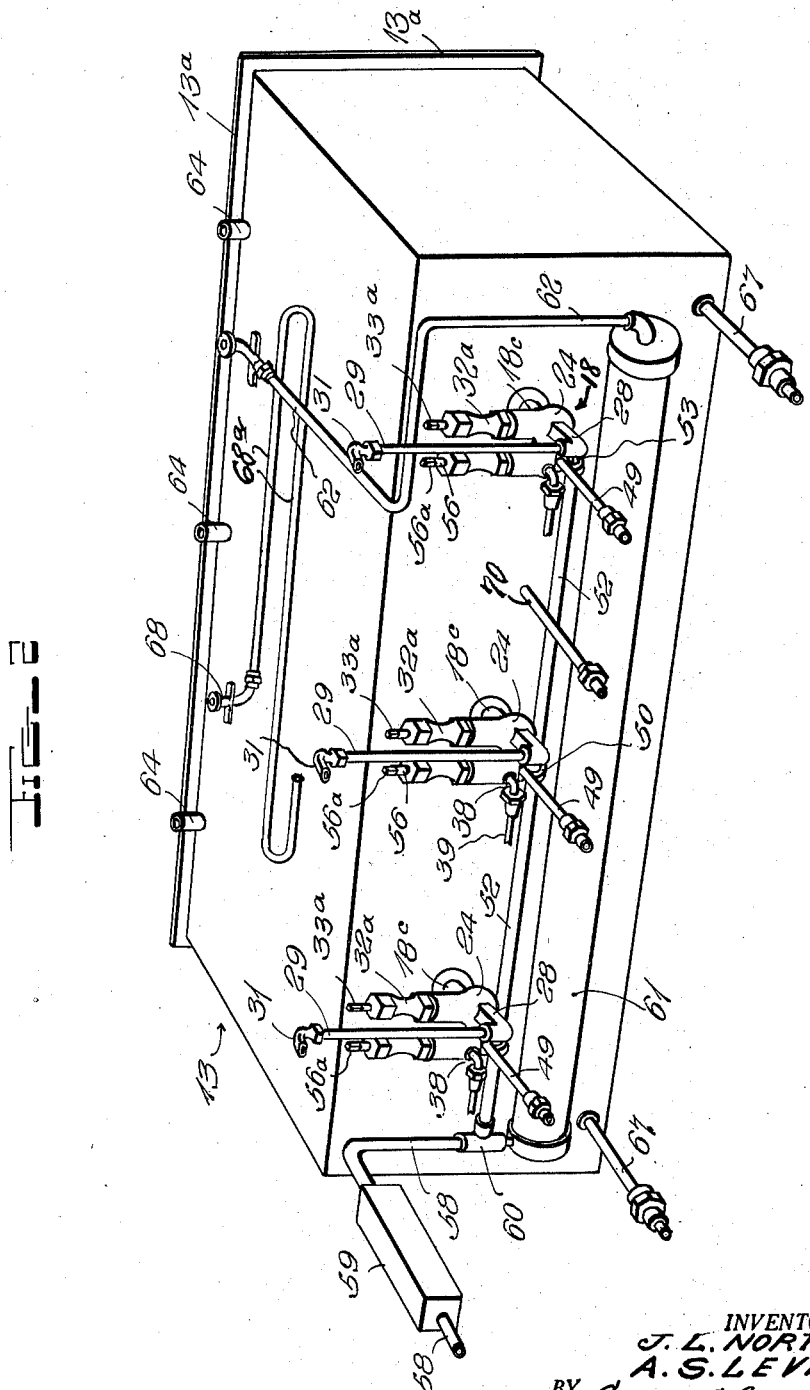

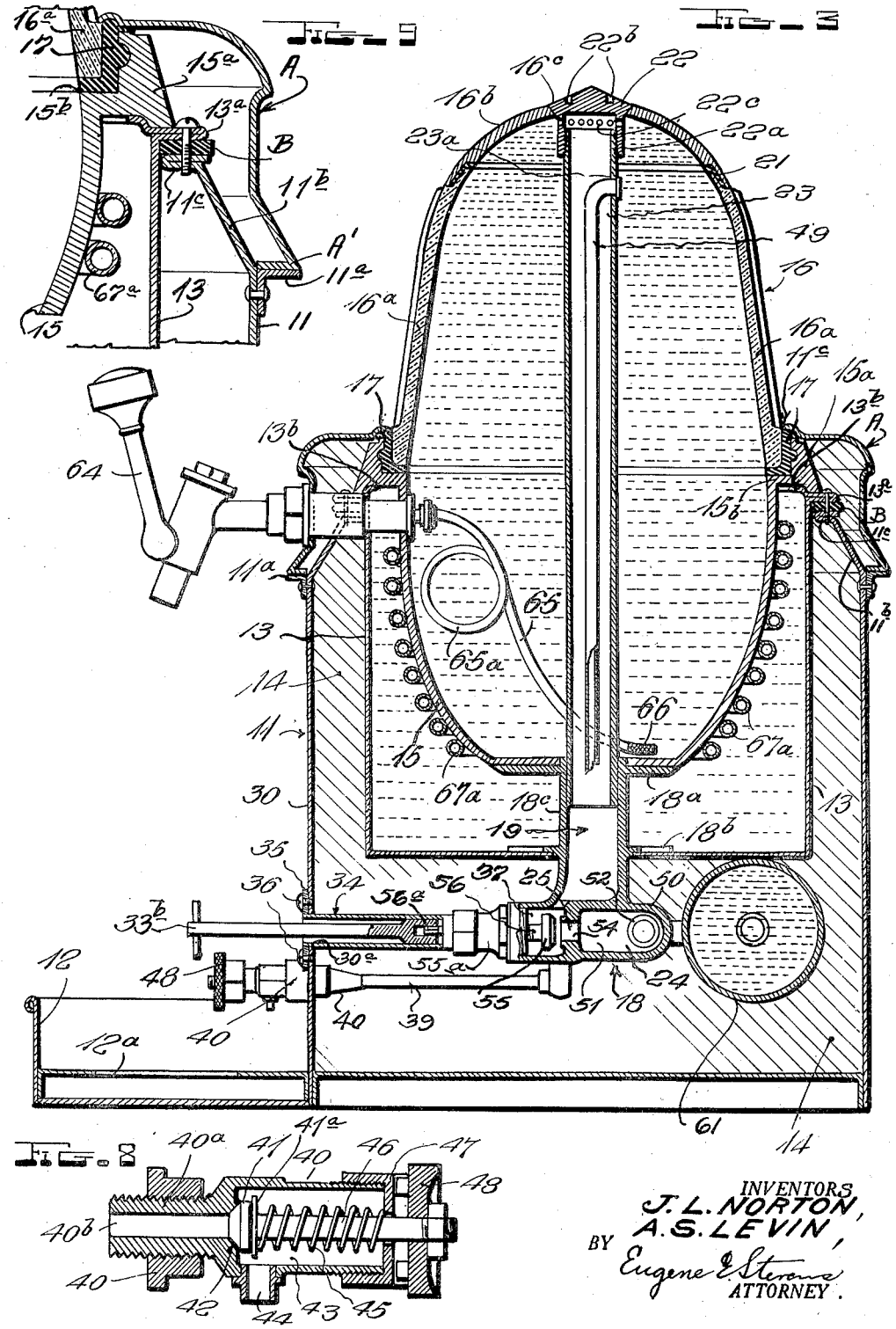

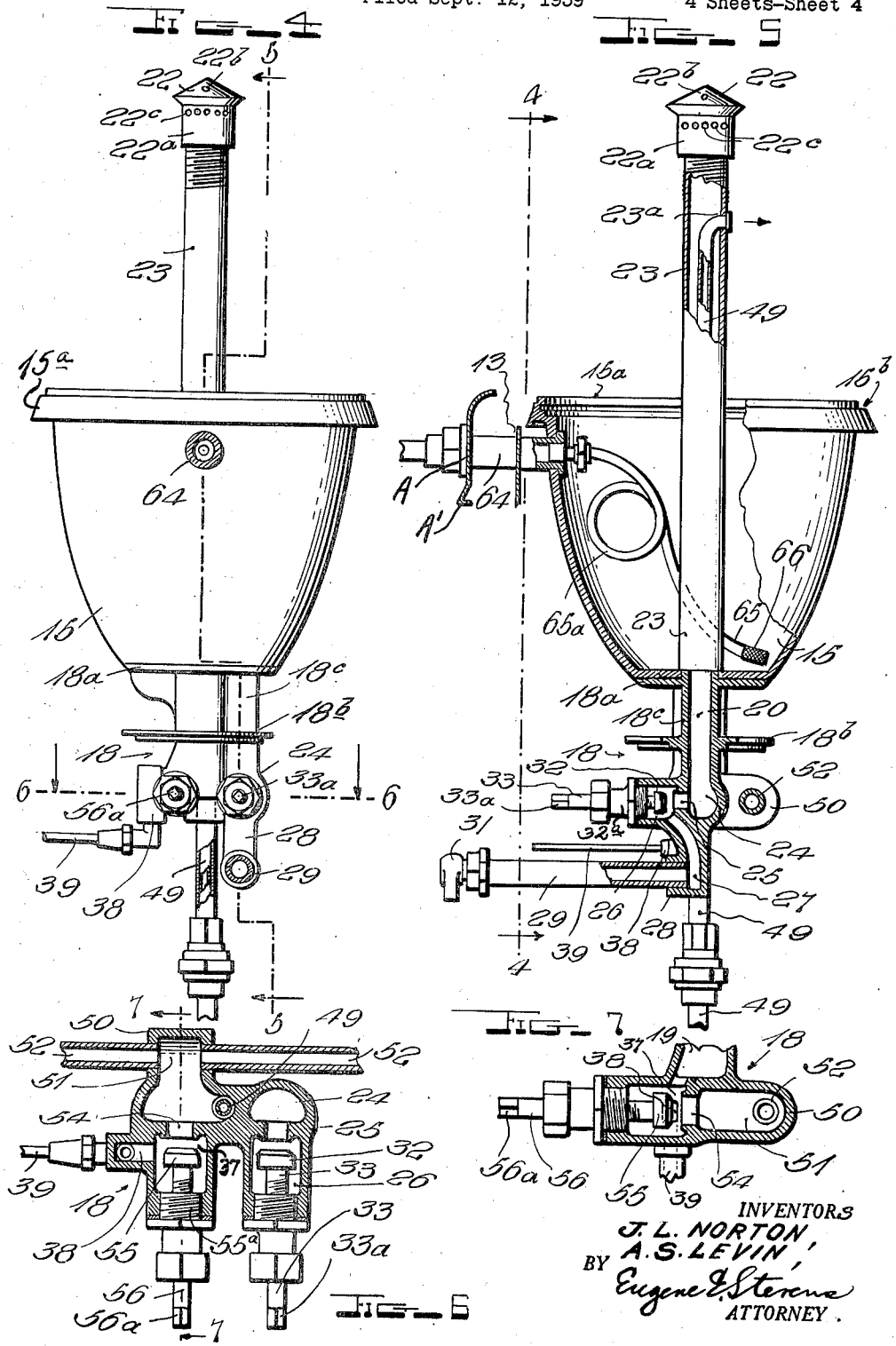

Patented Jan. 20, 1942

2,270,383

UNITED STATES PATENT OFFICE 2,270,383

BEVERAGE DISPENSING APPARATUS

John L. Norton and Abraham S. Levin, Philadelphia, Pa.; said Norton assignor to said Levin Application September 12, 1939, Serial No. 294,524

6 Claims. (Cl. 225—40)

This invention relates to improvements in beverage dispensing apparatus, and while suitable for the dispensing of beverages generally is especially adapted for gassy beverages, such as beer.

Briefly and generally stated, the present invention has for its primary object to improve upon the beverage dispenser disclosed in the John L. Norton Patent No. 2,167,309, dated July 25, 1939.

More specifically, it is an important object of the instant application to provide a beverage dispensing apparatus incorporating one or a plurality of individual beverage dispensing units, each of which latter includes a separable section beverage cooling and dispensing container, and means including a conduit member for holding the container parts assembled, said means, however, admitting of ready separation of the dispensing container parts for cleaning purposes.

A further object of the invention is to provide a beverage dispenser wherein the gas venting means and storage vessel drain discharge into a common drain pan which is also disposed to catch drippings from the beverage dispensing tap, or taps—the nature of the construction being such that all valves and pipes incorporated in said drain and vent means, and in an associated means for flushing out the same and the beverage container, are made conveniently available at the bartender's side of the dispenser without necessitating crawling under, or reaching under the apparatus. The positioning of the pipes and valves aforementioned is also such that they will be protected against damage in shipment of the apparatus.

The invention also resides in the provision, in association with a beverage storing and dispensing container, of a novel multiple valve-incorporating casing providing drain and venting means for the beverage container; a flushing means for the container, its beverage outlet, and said drain and venting means; a support for a beverage inflow pipe; and which valve-casing may also furnish reinforcing means for either or both of the beverage container and the cooling fluid tank in which said beverage container is disposed.

Still further objects of the invention are to provide a beverage dispenser which is simple in construction, easily cleaned, economical to operate, the arrangements being such that the beverage can be readily maintained at a predetermined temperature and/or pressure; and wherein means is provided for making readily available cool drinking water and/or seltzer water.

The invention also resides in certain features of construction, combination, and arrangement of the various parts and in modes and methods of operation—all of which will be readily understood and appreciated by those skilled in the art, upon reference to the accompanying drawings in connection with the detailed description appearing hereinafter.

In the drawings illustrating the now preferred form of the invention—which, however, is susceptible of considerable change and modification within the spirit and scope of the appended claims—

Figure 1 is a perspective view of a portion of a bar showing the beverage dispensing apparatus in place—certain parts of the latter being broken away and shown in section;

Figure 2 is a perspective view of an inner casing or tank for the beverage cooling fluid;

Figure 3 is a vertical sectional view taken on the line 3—3 of Figure 1;

Figure 4 is a vertical sectional view of one of the dispensing units taken on line 4—4 of Figure 5;

Figure 5 is a vertical sectional view taken on the line 5—5 of Figure 4;

Figure 6 is a horizontal sectional view through one of the multiple valve-incorporating casings, taken on line 6—6 of Figure 4;

Figure 7 is a sectional view taken on line 7—7 of Figure 6;

Figure 8 is a longitudinal sectional view through one of the purge cocks for exhausting excess air pressure; and Figure 9 is an enlarged fragmentary sectional view of the casing section and unit connection.

Referring to the drawings by reference characters, numeral 10 designates the usual counter-like bar which is cut out at its inner edge, as indicated at 10a, to receive the outer casing 11 of the beverage dispenser. Angle irons 11a secured to said outer casing 11 below the top thereof rest upon the bar or counter 10, as indicated in Figure 1, so as to support the casing 11 in place with its top disposed substantially above the plane of the counter 10. Outer casing 11 has the closure A, whose downturned endless wall terminates in a bead portion A' which rests upon angle iron 11a.

The inner casing 13, indicated as within the outer casing 11 and broken away in Figure 1, is best illustrated in Figures 2 and 3. Figure 3 illustrates that the endless, laterally extending top flange 13a of the inner casing 13 is supported by the top flange 11c of the inwardly slanting upper wall portions 11b of outer casing 11, so as to space said casings apart except at this point. The top of outer casing closure A is disposed well above the plane of the top of inner casing 13, as indicated. A gasket B is preferably interposed between flanges 13a, 11c and the same clamped tightly in place by machine screws or the like C. The space between the two casings 11, 13 will preferably be filled with suitable insulating material 14, as indicated in Figure 3.

In carrying out the invention, the inner casing 13 is filled, or substantially filled, with a solution of alcohol and water, or some other solution having a lower freezing point than water.

As illustrated herein, the beverage dispenser comprehends three separate and independent beer or other dispensing units, one of which is shown in vertical section in Figure 3. Each dispensing unit includes a beverage storage container comprising a cup-like lower section 15 and a dome-like upper section 16, which latter is supported by the shoulder 15b of a thickened lip 15a at the upper end of the cup-like lower container section 15. Lip 15a, as shown, lies close to the under surface of the cover A of casing 11. A suitable gasket 17 is interposed between shoulder 15b and the open lower end of the upper container section 16, as shown.

It is to be noted that the top wall closure A of outer casing 11 and the top wall of inner casing 13 have aligned holes 11c, 13b through which the beverage storage containers 15, 16 extend. Gasket 17 seals the space between the wall of hole 11c and the dome-like upper container section 16 and engages the under surface of closure A of the outer casing section 11. The lower surface of each lip 15a rests upon the top wall of the inner casing section 13 to seal the space about the lower cup-like container section 15, whereby to confine the alcohol and water, or other solution to the inner casing 13. It is also to be noted that lip 15a constitutes a means for supporting the container assembly 15, 16 with its lower cup-like section 15 immersed in the solution in the tank or casing 13 and spaced above the bottom thereof.

An additional support for the respective container assemblies 15, 16 is provided by the spaced concentric disks 18a, 18b of a multiple valve-incorporating casting 18. Figure 3 illustrates that the upper disk 18a underlies the bottom of cup section 15, and that the lower disk 18b seats on the bottom of the outer casing 13. By preference, the disks 18a, 18b will be soldered or welded to cup section 15 and the bottom wall of the inner casing 13, respectively.

The upstanding portion 18c of casing 18 which carries the disks 18a, 18b provides the combined air relief and flushing water inflow passage 19 (see Figures 3 and 7), and the separate drain outlet passage 20 (Figure 5) communicating between the beverage storage container 15, 16 and separate chambers in said valve-incorporating casting 18—all as will be presently explained in detail.

The lower and major portion of each upper dome-like container section 16 is of glass, as indicated at 16a, so as to display the beverage to be dispensed, and it includes a preferably cast bronze chrome finished cap 16b. This cap 16b has the concentric inwardly bevelled seat 16c in its top to receive the correspondingly formed under peripheral portion of the metal plug or nut 22. Nut 22 provides the sleeve 22a which is adapted to thread onto the upper end of an upstanding pipe 23 which, as will be hereinafter explained, constitutes a combined vent outlet and flushing water inlet pipe. The lower end of pipe 23 extends through the bottom of cup member 15 and is soldered or otherwise secured in the upper end of the passage 19 of casting portion 18c.

Apertures 22c in plug sleeve 22a above the upper end of pipe 23 establish communication between the same and the interior of the container 15, 16. A gasket 21 is interposed in the joint between container parts 16a, 16b. As will be evident, the container parts 15, 16, 16a will be tightly locked in place by screwing down the plug 22, 22a on pipe 23. The upper face of plug 22 provides the sockets 22b for lugs of a special wrench (not shown), but, of course, it may be otherwise formed to admit of being turned by an ordinary wrench.

Turning now to the multiple valve-incorporating casing 18, shown in Figure 5, it will be noted that the drain passage 20 opens into the drain chamber 24 of valve casing 18 which communicates through the valve seat 25 with the valve chamber 26 having the outlet passage 27. Valve casing 18 has the portion 28 carrying the forwardly extending drain pipe 29 which communicates with drain passage 27 and leads out through the front wall 30 of the outer casing 11. The removable drain spout 31 on the outer end of drain pipe 29 discharges into drain pan 12, as shown.

The valve 32 which controls the drain flow through seat 25 has its stem 33 threaded as usual in a packing gland-incorporating portion 32a of casing 18; and the outer end 33a of said stem is square so as to fit in the socket end of a wrench 33b which is used for opening and closing said valve 32. By preference, there will be a tube 34 (see Figures 1 and 3) through which wrench 33b is inserted, said tube being in part carried by the outer end of stem-carrying portion 32a and in part by a plate 35 which is secured by screws 36 to cover a hole 30a in the front wall 30 of the outer casing 11.

Figures 3, 6 and 7 show the valve-incorporating casing 18 as provided with the air pressure relief chamber 37 which is separate from the drain chamber 24 and is located alongside the latter. This air relief chamber 37 is in open communication with the air pressure relief passage 19 with which vent pipe 23 communicates. Chamber 37 has the laterally extending outlet 38 (Fig. 6) carrying the outlet pipe 39 (Fig. 3) whose outer end has the coupling member 40, which has a threaded socket portion which extends through front wall 30 of casing 11 and receives the rear threaded end 40a of the casing 40 of a relief valve 41, shown in Figures 1, 3 and 8.

Relief valve casing 40 has its air inlet passage 40b terminating in a seat 42 which opens into valve chamber 43 which has the outlet 44.

Relief valve 41 has the coil spring 45 disposed about its stem 46, one end of said spring abutting the valve shoulder 41a, and the other end against the adjustable cap 47 which is threaded on the outer end of said casing 40. A knurled disk 48 is fixedly secured to the outer end of cap 47 to facilitate the turning of same to vary the compression of spring 45 and consequently the amount of pressure necessary to unseat valve 41.

As shown, the beverage inlet pipe 49 for each container 15, 16, which leads from a supply keg (not shown) passes up through air relief passage 19 of valve casing 18, and up through pipe 23 to a point adjacent the top thereof where it turns laterally and opens into container 15, 16 through a hole 23a in vent pipe 23.

The means for flushing out and cleaning not only the entire interior of beverage storage casing 15, 16 and valve casing 18, but also all passages leading thereto and therefrom, including the beverage inlet pipe 49 will now be described.

Figures 2 and 3 show valve casing 18 as having the rearwardly extending projection 50 providing the water inflow chamber 51, and Figure 6 illustrates that each water inflow chamber 51 forms a part of a flushing water supply line 52. The remote end of the flushing water supply line is shown as closed by a plug 53 threaded into the outer side of the water inflow chamber wall of the rightmost valve casing 18 in Figure 2.

Each flushing water inflow chamber 51 is separated from its air pressure relief chamber 37 by a valve seat 54 against which a valve 55 will be kept seated except when the apparatus is to be flushed out. The flushing water control valve 55, which is similar to the drain control valve 32, works in the vent relief valve chamber 37, and its stem 56 has the squared end 56a to receive socket wrench 33b. The valve stem 56 is, of course, threaded as usual in the packing gland-incorporating portion 55a of valve casing 18, and said gland portion 55a, together with plate 35, support a guide tube 34 for directing the socket wrench to the squared valve stem end 56a.

Figure 2 indicates that water from the city water supply is passed to flushing water supply line 52, 51 from a pipe 58 in which is incorporated a pressure regulator 59. This pipe 58 opens into one head branch of the T-connection 60 whose stem branch is connected to flushing water pipe 52. The other head branch of T-coupling 60 is connected to one end of an elongated drinking water cooling and storage casing 61 which is mounted lengthwise under casing 13 and closely adjacent to the cold bottom thereof, as shown in Figure 3.

From the other end of the drinking water cooling and storage casing 61 leads the drinking water supply pipe 62 which extends forwardly adjacent the bottom of the inner casing 13 and upwardly adjacent its front wall, as best shown in Figure 2. A tap 63 on the end of drinking water supply pipe 62 at the exterior of the front wall of the outer casing 11 makes available at all times a supply of drinking water which has been cooled by the contact of storage casing 61 with the cold bottom wall of inner casing 13. Inner casing 13 will preferably be of copper or some equally good conductor of heat and cold.

A beverage dispensing cock 64 for each beverage storage chamber 15, 16 is shown, carried by front wall 39, and Figure 3 shows the beverage dispensing pipe 65 which communicates therewith as being coiled as at 65a, and having a strainer inlet 66 adjacent the bottom of beverage supply chamber 15, 16.

A continuous refrigerant pipe 67 which is incorporated in the circuit of a compressor (not shown) provides coils 67a soldered or otherwise secured to the exterior wall of each cup portion 15 of the beverage storage casing 15, 16. Said coils and cup portions 15 are, of course, immersed in the alcohol and water or other low freezing point solution in the inner tank or casing 13, so that said solution can be maintained at a predetermined temperature. By having the individual refrigerant coils in direct contact with cup members 15 very quick cooling of the contents of beverage containers 15, 16 is possible when the compressor is started.

So that cold carbonated or seltzer water may be supplied, there is provided a seltzer supply pipe 68 leading from a suitable source of supply and provided with the coil 68a adjacent the front wall of tank 13 for cooling purposes. The seltzer pipe 68 has the cock or tap 69 carried by front wall 39 of the outer casing 11 and threaded into a terminal fitting secured to the front wall of inner casing 13.

A drain 70 for the cold solution tank or inner casing 13 is shown in Figure 2. This casing 13 will have a suitable filling opening in the top (not shown) for admission of the alcohol and water or other low freezing point solution.

The operation of the apparatus may be briefly summarized as follows:

From the foregoing description, taken in connection with the accompanying drawings, it will be evident that when the plug, or nut, 22 is tightened down on the threaded upper end of the vent pipe 23 (see Figure 3) the container parts 15, 16a, 16b will be held in fluid tight assembly because the vent pipe 23 is welded or otherwise rigidly secured in the air pressure relief passage 19 of the multiple valve-incorporating casing 18. It is a simple matter to remove container parts 16a, 16b by simply removing the nut or plug 22.

The use of the glass dome portion 16a as a part of the dispensing containers 15, 16 is very important from a sales point of view, because the customer can actually see the beverage which he is buying.

The disposition of the refrigerant coils 67a in immediate contact with the bottom, or cup portions 15 of the dispensing containers 15, 16 makes for quick cooling of the beverage therein,—and consequently shorter periods of compressor operation, which results in economy in operation of the apparatus. The alcohol and water solution in the tank or inner casing 13 will, of course, be cooled by the refrigerant coils and pipe 67a, 67 and serves to maintain the beverage in dispensers 15, 16 cool. There will, of course, be thermostatic control associated with tank or casing 13 for maintaining the solution therein at a predetermined temperature by operation of the refrigerant compressor, not shown. This is conventional practice and for that reason has not been illustrated.

The disposition of the coil 68a of the seltzer water pipe 68, very closely adjacent the cold front wall of the refrigerant tank or casing 13 assures of a cool, but not too cold, supply of seltzer water at the tap 69 at all times. Likewise, the arrangement of the drinking storage casing 61 (Figure 3) adjacent the bottom of the tank or inner casing 13, assures of constant supply of cool drinking water to water tap 64.

When it is desired to flush out the various units 15, 16 and their various passages, it is only necessary to open the normally closed drain and water control valves 32, 55, after first, of course, disconnecting the appropriate beverage inflow pipes 49 from their sources of supply. Flushing water under city main pressure, predeterminedly reduced in well known manner by the water pressure regulator 58a (Figure 2) then passes from pipe line 52 through the water inflow chamber 51 of valve casing 18, through the valve seat 54, and into the air pressure outlet chamber 37. From the air pressure outlet chamber 37 of valve casing 18 a flow of water passes out gas relief pipe 39 and purge cock 40; and likewise up the passage 19 and upstanding vent pipe 23 and out through the sleeve holes 22c in the plug or nut member 22 into the container 15, 16.

It will frequently be desirable to close drain valve 32 to effect pressure discharge of the water from the casing or receptacle 15, 16 out through the beverage inlet pipe 49. Also, when beverage tap 64 is opened, the beverage outlet pipe 66, 65, 65a will be flushed out. Inasmuch as the beverage tap 64, drain spout 31, and the air outlet, or purge cock 40 all discharge into the frontal drain pan 12, there is no necessity to provide a special receptacle for receiving and carrying off the flushing water.

As will be appreciated from the foregoing, it is a simple matter to maintatin the apparatus clean at all times so as to assure of the beer, or other beverage having its normal proper taste.

The purge cock 40 will be adjusted so that its valve 41 will unseat to let out excess air pressure from the top portion of dispensing container 15, 16. This feature is important as it assures of a substantially uniform air pressure on the beverage in containers 15, 16 at all times. This enables the bartender to draw uniform glasses of a beverage, such as beer, without excess foaming, as is usually the case and necessitates "topping" of the glass—or tediously slow filling of the same.

All metal parts with which the beverage comes in contact will be of non-corrosive material which lends itself to ready cleaning, and is impervious to chemical attack by the constituents of the beverage.

In conclusion, attention is invited to the multi-function nature of the plural valve casting 18 with its rigidly carried upstanding vent pipe 23 and disks 18a, 18b. Pipe 23 and valve casing 18 support beverage inlet pipe 49 in addition to serving as a tie means to hold beverage container parts 15, 16a, 16b assembled. Disk 18b seats the valve casing assembly in place at the bottom of the inner casing 11, while the upper disk 18a carries the lower beverage container member 15. And in addition to its venting and drain providing functions, valve casing 18 makes the connection 50 with the flushing water line 52.

Finally, the valve casing 18, acting through its disk portions 18a, 18b and the passage-providing portion 18c which are immersed in the cold alcohol and water solution in the tank or inner casing 13, transmits, by conduction, the coldness of the solution to the vent pipe 23, which is immersed in the beverage in container 15, 16—as a further aid in maintaining same cold.

Having thus described our invention, what we claim as new is:

1. The combination of a beverage dispensing apparatus comprising spaced inner and outer casings, the inner casing providing a cooling fluid containing chamber, lineally spaced beverage dispensing containers carried by said inner casing and extending into said cooling fluid chamber, a refrigerant carrying pipe in said chamber and having portions coiled about said beverage containers in direct contact therewith, a valve casing between the walls of said casings, conduit providing means carried by said valve casing and extending into said beverage dispensing container, and lineally spaced supporting means carried by said conduit-providing means and engaging said beverage container and the inner casing wall to maintain the same spaced.

2. In a beverage dispensing apparatus, having an outer casing, an inner cooling fluid-chamber-providing casing having its bottom wall spaced from the bottom wall of the outer casing, a drain pan carried by the front wall of said outer casing, a beverage dispensing container having at least a portion thereof extending into said cooling fluid chamber, supply and dispensing means for said beverage container and the dispensing means being over said drain pan, separate venting and drain conduits leading from said beverage container and having outlets likewise discharging into said drain pan.

3. In a beverage dispensing apparatus, including a beverage dispensing container, supply and dispensing means for said container, and separate venting and drain conduits leading from said container; a multiple valve casing for said conduits, said casing having a vent chamber incorporated in said vent conduit and a drain chamber included in said drain conduit, a valve controlling the flow through said drain chamber, a flushing water supply line, said valve casing having a flushing water inlet chamber, a valve seat separating said flushing water inlet chamber from said vent chamber, a flushing water control valve normally engaging said seat, a vent control valve for said venting conduit, and control means for said drain and flushing water control valves.

4. In a beverage dispensing apparatus including a closed beverage container, conduit means for drawing beverage therefrom, a separate pressure relief conduit for said container, means for supplying flushing water to said container, valve means for selectively discharging said flushing water through each condut, and a combination pressure relief valve and purge cock on said pressure relief conduit.

5. In a beverage dispensing apparatus, including a closed beverage container, conduit means for drawing beverage therefrom, separate conduit means for draining said container, a separate air pressure relief conduit leading from said container, means for supplying a flushing liquid to said container, and valve means for selectively discharging said flushing liquid through each conduit.

6. The structure of claim 5, and a combination pressure relief valve and purge cock on said pressure relief conduit.

JOHN L. NORTON.
ABRAHAM S. LEVIN.